(12) United States Patent
Kotschote et al.

(10) Patent No.: US 10,888,948 B2
(45) Date of Patent: Jan. 12, 2021

(54) METHOD FOR JOINING AT LEAST TWO STRUCTURAL PARTS

(71) Applicant: AUDI AG, Ingolstadt (DE)

(72) Inventors: Christian Kotschote, Köthen (DE); Christian Neudel, Adorf/Vogtland (DE); Carsten Bär, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 399 days.

(21) Appl. No.: 15/500,389

(22) PCT Filed: Jul. 1, 2015

(86) PCT No.: PCT/EP2015/001328
§ 371 (c)(1),
(2) Date: Jan. 30, 2017

(87) PCT Pub. No.: WO2016/020025
PCT Pub. Date: Feb. 11, 2016

(65) Prior Publication Data
US 2017/0216956 A1   Aug. 3, 2017

(30) Foreign Application Priority Data
Aug. 2, 2014   (DE) .................. 10 2014 011 599

(51) Int. Cl.
*B23K 11/11*   (2006.01)
*F16B 5/08*   (2006.01)
(Continued)

(52) U.S. Cl.
CPC ............ *B23K 11/115* (2013.01); *B21J 15/00* (2013.01); *B23K 11/20* (2013.01); *F16B 5/04* (2013.01);
(Continued)

(58) Field of Classification Search
CPC ... B23K 11/115; B23K 11/20; B23K 2103/20; B21J 15/00; F16B 5/04; F16B 5/08; F16B 19/086; F16B 33/008; F16B 2019/45
See application file for complete search history.

(56) References Cited

U.S. PATENT DOCUMENTS 2,465,534 A  *  3/1949  Havener .................. B21J 15/02
                                                    29/464
5,178,502 A  *  1/1993  Sadri .................... F16B 19/1063
                                                    411/361
(Continued)

FOREIGN PATENT DOCUMENTS

DE            20319610 U1  *  3/2004  ............ F16B 19/086
DE    10 2008 004 299 A1      7/2009
(Continued)

OTHER PUBLICATIONS

Machine Translation of EP2722124. Amedick Juergen et al. "Method for joining at least two components with a resistance welding element, and device for carrying out the method and resulting composite component". (Year: 2014).*
(Continued)

*Primary Examiner* — David P Bryant
*Assistant Examiner* — Nirvana Deonauth
(74) *Attorney, Agent, or Firm* — Henry M. Feiereisen LLC

(57) ABSTRACT

A method for joining at least two structural parts includes a fitting step in which a joining element is driven into the first structural part while a residual material thickness is maintained, and a joining step in which the joining element driven into the first structural part is connected to the second structural part. The joining element has a hollow element shaft, which is driven into the first structural part, and an
(Continued)

element head, which is welded or adhesively bonded to the second structural part.

18 Claims, 4 Drawing Sheets

(51) Int. Cl.
*B23K 11/20* (2006.01)
*F16B 5/04* (2006.01)
*F16B 19/08* (2006.01)
*F16B 33/00* (2006.01)
*B21J 15/00* (2006.01)
*B23K 103/20* (2006.01)
*F16B 19/04* (2006.01)

(52) U.S. Cl.
CPC ............ *F16B 5/08* (2013.01); *F16B 19/086* (2013.01); *F16B 33/008* (2013.01); *B23K 2103/20* (2018.08); *F16B 2019/045* (2013.01)

(56) References Cited

U.S. PATENT DOCUMENTS 7,628,573 B2 * 12/2009 Philipskotter ......... F16B 19/086
 411/501
7,828,912 B2 * 11/2010 Okamoto ............. C21D 8/0205
 148/320
2002/0006321 A1  1/2002 Singh et al.
2005/0158138 A1 * 7/2005 Schneider ............ F16B 37/067
 411/43
2009/0158804 A1  6/2009 Jung et al.
2013/0294866 A1  11/2013 Singh et al.

FOREIGN PATENT DOCUMENTS

| | | |
|---|---|---|
| DE | 10 2004 025 492 A1 | 8/2009 |
| DE | 10 2010 020 569 A1 | 11/2011 |
| DE | 10 2012 104 364 A1 | 11/2013 |
| DE | 10 2012 020 222 A1 | 4/2014 |
| EP | 0 720 695 B1 | 7/1996 |
| EP | 2 032 281 B1 | 3/2009 |
| EP | 2 032 282 B1 | 3/2009 |
| EP | 2 127 797 A1 | 12/2009 |
| EP | 2 314 890 A2 | 4/2011 |
| EP | 2 722 124 A1 | 4/2014 |
| WO | WO 2011/023616 A1 | 3/2011 |

OTHER PUBLICATIONS

International Search Report issued by the European Patent Office in International Application PCT/EP2015/001328.

* cited by examiner

METHOD FOR JOINING AT LEAST TWO STRUCTURAL PARTS

CROSS-REFERENCES TO RELATED APPLICATIONS

This application is the U.S. National Stage of International Application No. PCT/EP2015/001328, filed Jul. 1, 2015, which designated the United States and has been published as International Publication No. WO 2016/020025 and which claims the priority of German Patent Application, Serial No. 10 2014 011 599.2, filed Aug. 2, 2014, pursuant to 35 U.S.C. 119(a)-(d).

BACKGROUND OF THE INVENTION

The invention relates to a method for joining at least two components according to patent claim 1 and an auxiliary joining element according to patent claim 12, which can be used as an auxiliary joining element in such a method.

In automobile construction the vehicle body can be manufactured in a mixed construction in which for example semi-finished aluminum parts and semi-finished steel parts are joined. The semi-finished parts can hereby preferably be connected to each other by a mechanical joining method (i.e. without change in microstructure), for example a semi-hollow punch riveting in which during the riveting process a semi-hollow punch rivet element perforates the component, which is first in riveting direction, and is driven into the second component, for example while maintaining a residual material thickness in the second component. Such a semi-hollow punch riveting is for example described in EP 231 4890 A2. In ultra-high-strength steels the semi-hollow punch riveting does not offer a sufficient joining quality due to the very high material strengths of the steel. For example the rivet may be damaged or may not be sufficiently formed.

As an alternative to the semi-hollow punch riveting a resistance element welding can be used, in which in a first setting step a bolt-like auxiliary joining element is riveted into a first component (for example an semi-finished aluminum part) and perforates the first component on the bottom. In the aluminum material of the first component the auxiliary joining element acts as a welding insert, to which a second component (for example a semi-finished steel component) can be welded. In the subsequent welding step the front side (i.e. the element foot of the auxiliary joining element), which faces away from the element head of the auxiliary joining element and is exposed on the bottom in the first component, is welded to the second component (i.e. the semi finished steel product). Such a resistance element welding is known for example from DE 10 2004 025 492 A1.

The above-stated conventional joining methods, i.e., the semi-hollow punch riveting or resistance element welding, have several drawbacks and limitations: for example the element head of the auxiliary joining element remains visible also after completion of the joining connection and protrudes with a head projection over the component surface. In addition a gap may form between the element head of the auxiliary joining element and the component contacting it, which gap may become greater under the influence of mechanical stress and corrosive media may enter through the gap. In resistance welding the welding current flows directly onto the auxiliary joining element and the semi-finished steel product. As a result of a potentially present offset or an eccentric contact of the welding electrodes on the auxiliary joining element the direction of current flow changes which may lead to a shunt between the semi-finished steel product and the semi-finished aluminum product. As a result insufficient heat is available for the formation of a weld nugget, which may lead to a reduced connection formation. In addition an angle or lateral offset of the spot welding electrodes leads to a slanted position of the auxiliary joining element.

It is an object of the invention to provide a method for joining at least two components in which a reliable connection of the two components is enabled in a simple manner in terms of process and manufacturing.

SUMMARY OF THE INVENTION

The object is solved by the features of the independent patent claims. Preferred embodiments of the invention are disclosed in the dependent claims.

In the method according to the invention, an auxiliary joining element is driven in a setting step into a first component while maintaining a residual material thickness in the first component. In a subsequent joining step (for example a welding step or a gluing step) the auxiliary joining element that has been driven into the first component is materially bonded, i.e., welded or glued with the second component. According to the invention the auxiliary joining element is constructed similar to a semi-hollow rivet element, i.e., with a hollow element shaft, which is driven into the first component and an element head, which is materially bonded, i.e., welded or glued, with the second component.

Furthermore glue can be additionally applied between the first and the second component as it is common praxis in joining aluminum and steel components. By using a defined head projection of the auxiliary joining element the glue can be locally displaced, which leads to a better welding result.

The auxiliary joining element according to the invention is thus not used as a rivet element in a riveting process. A riveting process is characterized in that multiple components are joined by means of the rivet element. In the method according to the invention on the other hand only the auxiliary joining element is punched in, preferably into a sheet metal/component, and is therefore no longer to be regarded as a rivet. In addition in the method according to the invention the auxiliary joining element is formed at least once, preferably twice, by the welding process. During riveting the semi-hollow punch rivet is deformed only once.

In contrast to the conventional jointing methods the auxiliary joining element is thus introduced between the two components, i.e., it is invisible from the outside and is protected against external mechanical stress. In contrast to the conventional semi-hollow punch riveting, in the inventive process the auxiliary joining element is preferably punched into a single component. Thus there is a significantly reduced sheet thickness for the punching process compared to the state of the art. When using conventional semi-hollow punch rivets this leads to problems because these semi-hollow punch rivets are not configured for use as a welding element, i.e., they are not configured to withstand thermal stress. In addition the conventional semi-hollow punch rivets are not configured for such a punch process in which the available total sheet thickness is strongly reduced. As a result the mechanical stress may lead to cracks or uneven bracing and/or very small residual bottom thickness when punching in the semi-hollow punch rivets.

For avoiding these problems the auxiliary joining element according to the invention is configured with the material, the geometry, the coating, the strength and/or the die used in the setting step (punch-in process) in mind. With regard to the material of the auxiliary joining element, preferably a cold-upset steel or a cold-extruded steel can be used. This provides economic manufacturing by offering the option to use a cold heading process. In addition the material can have a significantly lower carbon content than a rivet material that is used in a conventional semi-hollow punch rivet element. The used material additionally has to be suited for welding. For example the following materials are suitable: 17MnB4, 19MnB4, 27MnB4. Such materials aid improving the deformation behavior of the auxiliary joining element and avoiding cracks in the element. With regard to the geometry it is preferred when the material thickness in the element head is significantly increased compared to the material thickness in the walling of the element shaft, which results in a material thickening in the element head with which sufficient welding material for forming the weld nugget between the element head and the second component can be provided. For example the head-side height of the element head can be produced as small as possible so that the gap between the first component (aluminum) and the second component (steel sheet) can be adjusted in a targeted manner. The head height in the center of the auxiliary joining element (i.e., along its longitudinal axis) can preferably be between 1 and 1.5 mm, preferably 1.3 mm in order to realize the formation of the weld nugget and a sufficient weld nugget depth in the second component (steel element). The heat generated in the second component during the welding process is thereby significantly lower than when using conventional semi-hollow punch riveting. In addition in the welding step a sagging of the melt into the first component (aluminum sheet) can be prevented. Adverse effects on the material of the first component are thus limited to a minimum.

The head diameter of the auxiliary joining element can preferably be between 5 and 8 mm, preferably 5.5 mm. Such a diameter is required in order to ensure a sufficiently large contact surface for the electrode caps that are placed on the auxiliary joining element in the welding step. In addition the head diameter also enables compensating for tolerances in the angular offset and lateral offset of the welding electrodes. The outer diameter of the element shaft can be between 3 and 6 mm preferably 3.3 mm. Particularly preferably the head diameter can be configured similar as in a semi-hollow punch rivet. The outer contour of the auxiliary joining element according to the invention approximately corresponds to the outer contour of the semi-hollow punch rivet so that during manufacture the same system can be used. This means no new operating means have to be developed. The geometry can hereby vary depending on the application at hand or the conditions of new system technologies.

In an embodiment the topside of he element head of the auxiliary joining element can be configured planar parallel. As an alternative the element head of the auxiliary joining element can be at least partially bulged upward dome-shaped at its topside, i.e., so as to form the above-mentioned material thickening. Depending on the required application arbitrary shapes/geometries are conceivable that have also proven useful in projection welding, for example dome-shaped, spherical pointed, angular etc. The current flow and with this also the configuration of the weld nugget can thus be controlled or configured in a targeted manner.

According to the invention the weld nugget forms centrally between the auxiliary joining element and the inside of the second component (steel sheet). With this the disadvantages of an eccentric materially bonding connection and a poor weld nugget formation, slanted position of the auxiliary joining element, formation of pores and hollow spaces and anisotropic strength properties can be reduced. The diameter of the above dome-shaped material thickening can be smaller than the element head diameter and can be of a height so that a permissible gap is generated between the two components.

Preferably the outer diameter of the shaft can be between 3 and 6 mm. In the case of smaller flange widths in the vehicle body preferably the lower threshold value of the shaft diameter can be selected and in the case of higher connection stiffnesses preferably the upper threshold value can be selected. Depending on the sheet thickness of the first (aluminum sheet) the element length along its longitudinal axis can be between 2.0 and 4.0 mm. This ensures that during the punching in of the auxiliary joining element (setting step) a sufficient undercut is generated.

The auxiliary joining element can have a ring contour at its element base, which faces away from the element head. The ring contour can preferably be formed by a ring-shaped circumferential acute angle contact edge, which during the setting step serves as a base cutting edge. The base cutting edge is preferably configured so with an acute angle in order to prevent a premature deformation of the auxiliary joining element. This makes it in particular possible to use particularly small die diameters of 5 to 7.5 mm.

The coating of the auxiliary joining element can preferably be made of zinc. The coating thickness should hereby be limited to a minimum preferably to a coating thickness of 5 µm. The coating acts as corrosion protection especially also during storage of the auxiliary joining elements. As an alternative to a zinc coating also a zinc nickel compound or Almac can be used. In addition further coatings such as a zinc lamella coating and others are conceivable if needed, as well as uncoated welding elements.

The material strength of the auxiliary joining element should be adjusted to the particular application and the materials and can for example preferably be between 950 and 1100 N/mm$^2$ so that in the setting step the auxiliary joining element can cut into aluminum material of the first component and at the same time is still sufficiently ductile for a deformation in the aluminum material.

For the pressing of the auxiliary joining element into the first component (preferably an aluminum sheet metal) a special flat die with particularly small die gravure is used. Hereby the depth is to be reduced to a minimum while at the same time still providing a sufficient volume for the displacement of the first component. In this way the auxiliary joining element can be optimally deformed in the setting step. The reduced dimensions of the die reduce the visibility of the rivet from outside which in turn expands the range of applications. Potentially also a die without gravure (i.e. an anvil) can be used. The die, due to its geometry, influences the welding process. Therefore it may be necessary to change from the flat die to a different shape, for example a spherical or dome-shaped mold. The diameter of the die gravure is for example between 4 and 8 mm, preferably 5.5 mm and the depth is between 0 to 1 mm, preferably 0.5 mm.

The invention is not limited to the described aspects. Thus also a multi-sheet connection is conceivable, i.e., for example with multiple steel sheets. As an alternative the auxiliary joining element can be driven into two aluminum sheets and can then be welded with one or multiple steel sheets. In addition the element can also be punched into a less high-strength steel and aluminum and can subsequently be welded to further higher-strength steel components.

In addition the auxiliary joining element should have an element head projection relative to the aluminum sheet after the setting process in order to improve the welding process analogous to the projection welding. The head projection should be selected so that a reproducible weld nugget can be generated. An insufficiently large projection leads to a shunt during welding and excessive projections lead to slanted positions of the element or to increased welding splatter. In the here described auxiliary joining element a head projection of 0.3-0.5 mm is preferably to be set. This head projection can however also be different after change of the element geometry.

In the welding process different electrode caps (form F, A, C, or others) can be used, preferably for example electrode end caps of the form F with a contact surface to the joining part between 4 to 10 mm. However, also any other caps and a combination of different forms are conceivable.

BRIEF DESCRIPTION OF THE DRAWING

The advantageous embodiments and/or refinements of the invention explained above and/or set forth in the dependent claims can be used individually or in any combination—except for example in cases of clear dependencies or irreconcilable alternatives.

In the following the invention and its advantageous embodiments and refinements and their advantages are explained in more detail by way of drawings.

Figure 1:
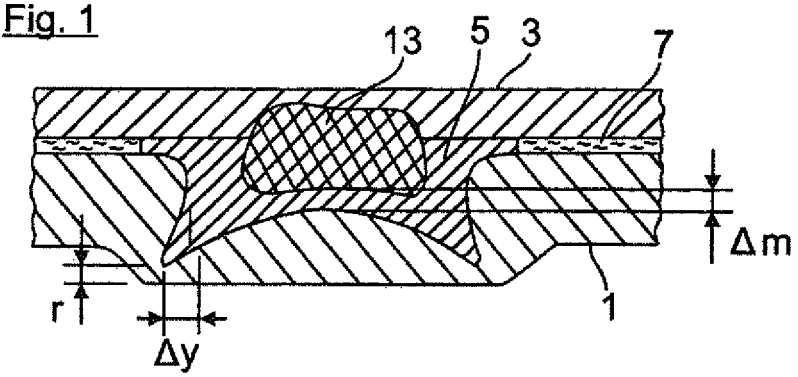
Figure 2:
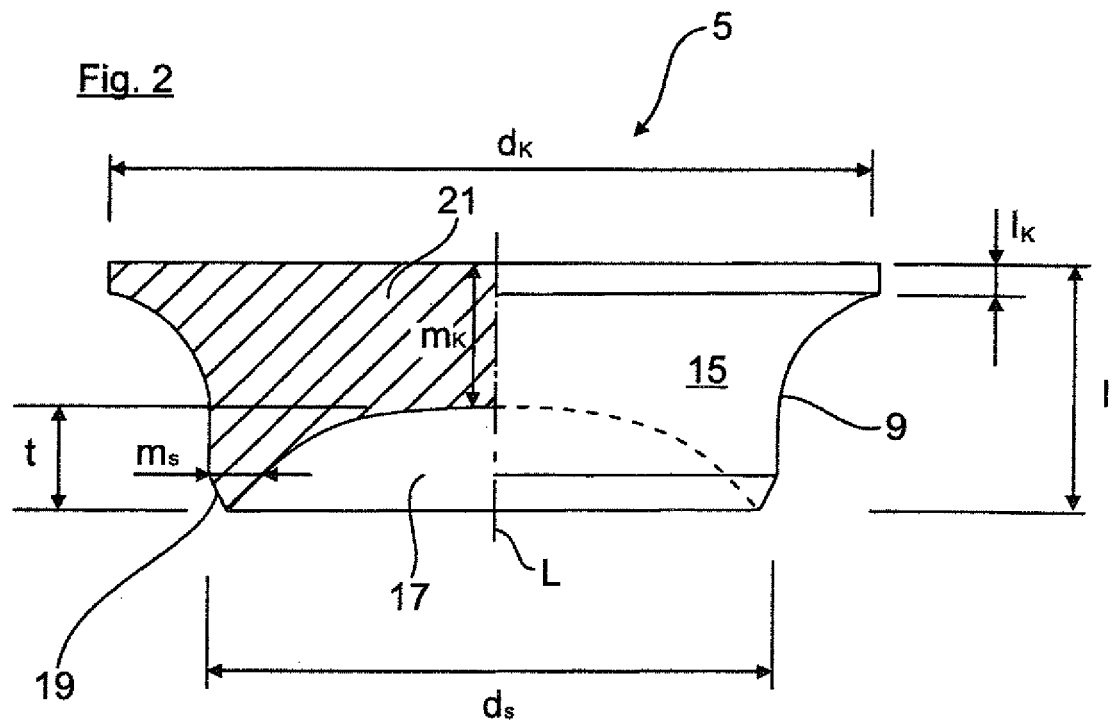
Figure 3:
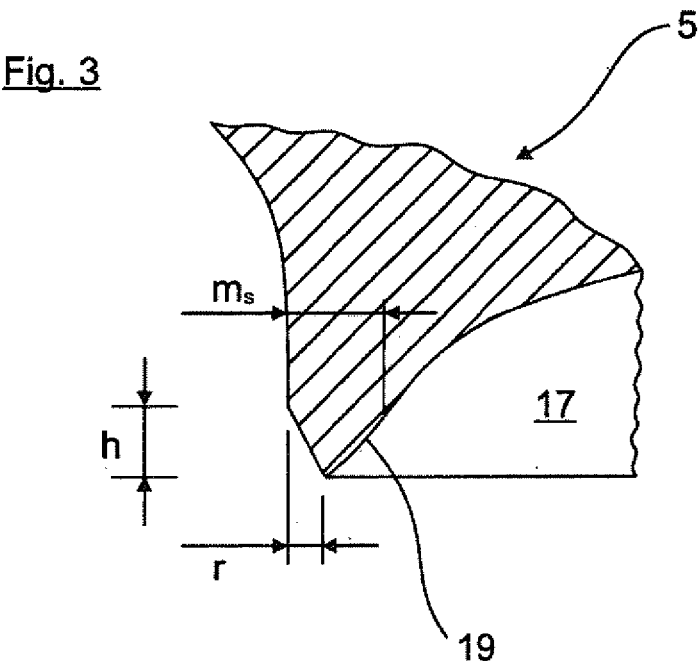

It is shown in:

FIG. 1 in a partial sectional view a component connection;

FIG. 2 in a partial side sectional view an auxiliary joining element by itself;

FIG. 3 a detail view of FIG. 2

Figure 4:
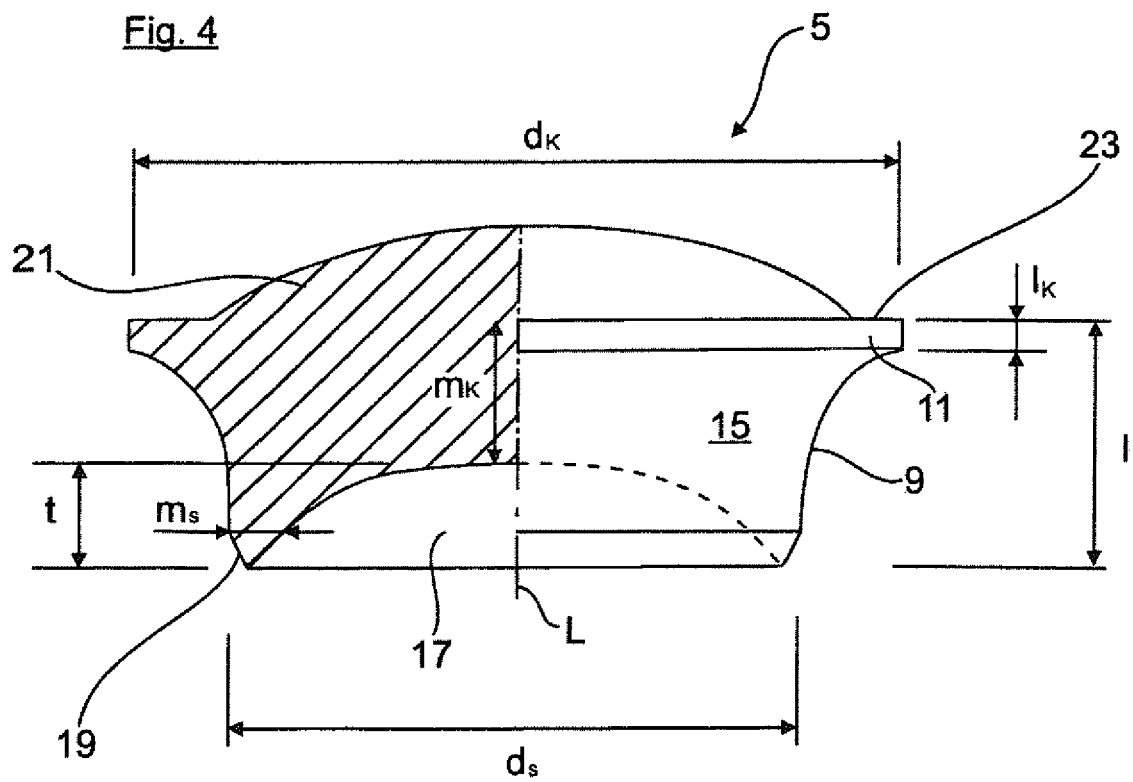
Figure 5:
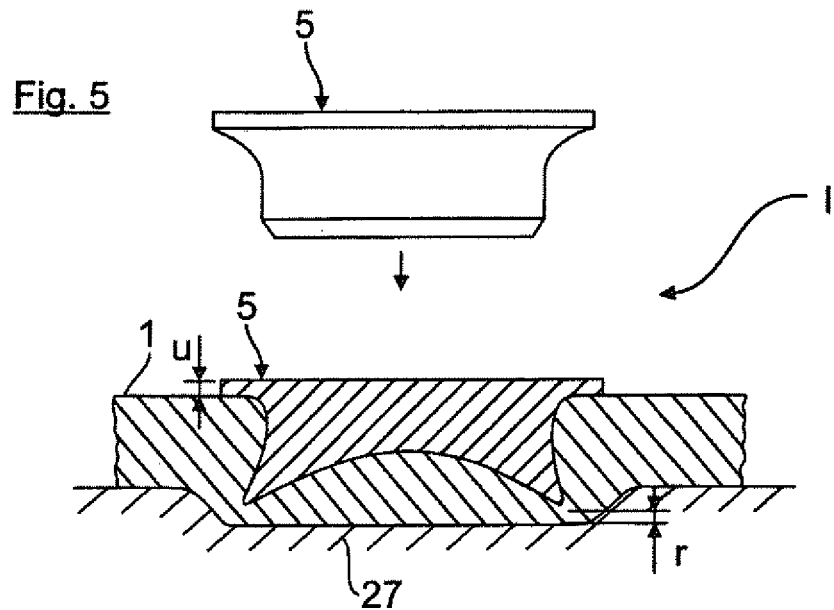
Figure 6:
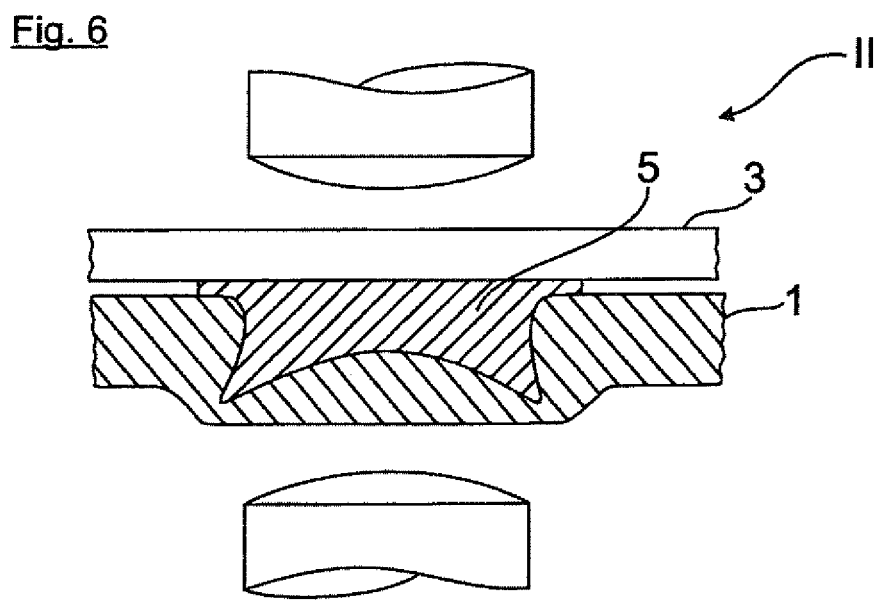
Figure 7:
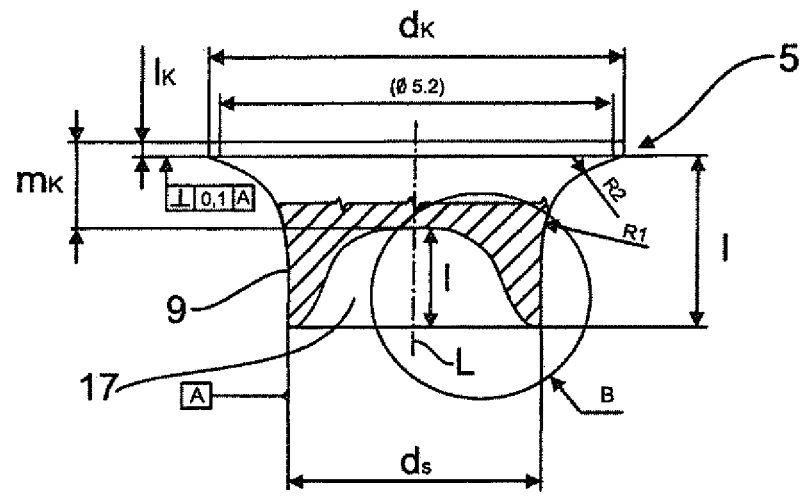
Figure 8:
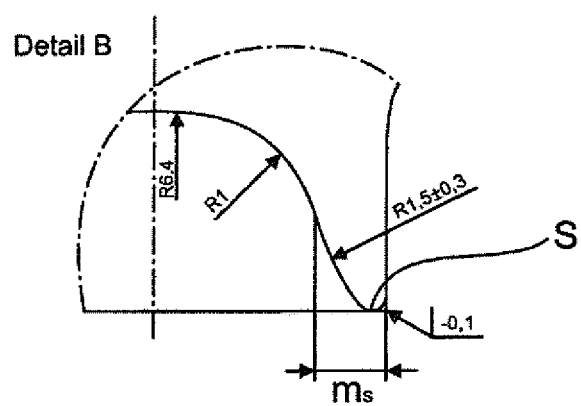

FIG. 4 a view corresponding to FIG. 2 a further exemplary embodiment of the auxiliary joining element;

FIGS. 5 and 6 respective views, which illustrate the process steps for producing the component connection shown in FIG. 1;

FIGS. 7 and 8 respective views of an auxiliary joining element according to a further exemplary embodiment, which compared to the exemplary embodiments of FIGS. 2 and 4, is the most preferred exemplary embodiment.

DETAILED DESCRIPTION OF PREFERRED EMBODIMENTS

FIG. 1 shows a finished component connection in which an aluminum sheet as a first joining partner is connected with a steel sheet 3 as a second joining partner. The two joining partners 1, 3 are connected with each other via an auxiliary joining element 5. In addition an adhesive layer 7 is provided between the joining partners 1, 3. The above material pairing is purely exemplary. As an alternative also any other materials are conceivable, for example magnesium and potentially also plastic materials.

According to the figures the auxiliary joining element 5 is formed with a hollow element shaft 9 and an element head 11. In FIG. 1 the element shaft 9 is driven into the material of the aluminum sheet (first joining partner) 1 in a setting step I described below while maintaining a residual material thickness r. The element head 11 of the auxiliary joining element 5 on the other hand is welded with the second component (steel sheet part) 3 so as to form a weld nugget 13.

The above-mentioned setting step I is conceivable in an upstream process step. As an alternative the setting step is also conceivable in the pressing tool of the component forming shortly thereafter or shortly prior to the welding process. A suitable system would be a robot or a fixed setting device for the parallel setting of multiple elements. This leads to a higher accuracy and faster cycle times.

FIG. 2 shows the auxiliary joining element 5 by itself in a finished state. Accordingly the auxiliary joining element 5 is for example configured rotation symmetric about a longitudinal axis L, wherein a walling 15 of the element shaft 9 delimits a hollow dome shaped space 17, which is open towards the bottom, and which in axial direction is worked into the element shaft 9 with a material depth t. The element shaft walling 15 has a material thickness $m_e$ which in FIG. 2 exemplarily is only one third of the element head material thickness $m_K$ which results along the longitudinal axis L. In this way the element head 11 is formed with an additional material thickening 21, which provides a sufficiently great amount of welding material for the formation of the weld nugget 13. This material thickening 21 is hereby dimensioned so that after the welding step II (FIG. 6) a sufficiently material thickness $\Delta m$ (FIG. 1) remains in the element head 11 without change of microstructure.

In FIG. 2 the head diameter $d_K$ is 5.5 mm, while the outer diameter $d_S$ of the shaft is 3.35 mm. The length l of the auxiliary joining element 5 in FIG. 2 is 2.8 mm, wherein a side height $l_K$ of the head is about 0.3 mm.

As can be further seen from FIGS. 2 and 3, the auxiliary joining element 5 has at its side, which faces away from the element head 11, an element base 19 with a ring contour, which is configured as a circular circumferential acute angle contact edge. During the setting step (FIG. 5) the contact edge 19 acts as a base cutting edge with which a premature deformation of the auxiliary joining element 5 in the setting step I is prevented and at the same time a spreading apart of the element shaft 9 by a predetermined spread path $\Delta y$ (FIG. 1) radially outwardly is controlled. Preferably the spread path $\Delta y$ (FIG. 1) should be greater than 0.1 mm. In addition the undercut can be greater than 0.1 mm, preferably 0.3 mm, prior to the welding so that after the welding a sufficient strength of the element in the joining part 1, preferably aluminum part, is present.

The geometry of the contact edge (base cutting edge) 19, which is required therefore can be seen in FIG. 3. According to this the contact edge 19 is radially inwardly offset by a radial offset r from the outer wall of the element shaft, wherein the radial offset r is about 0.15 mm. According to FIG. 3 the height h of the ring contour 19 is about 0.35 mm. The measurements stated herein are to be understood as merely exemplary and do not limit the general inventive idea.

FIG. 4 shows a view according to FIG. 2 of a further auxiliary joining element, which has substantially the same geometry as in FIG. 2 with the exception of the element head 11. In FIG. 4 the topside of the element head 11 is not configured plan parallel but rather with a dome shaped material thickening 21 (welding buckle) upwards bulged. The dome shaped material thickening 21 extends not directly up to the outer rim of the element head 11 but rather over a planar parallel circumferential ring shoulder 23 spaced apart from the outer rim 20 of the element head 11. In this way a central configuration of the weld nugget 13 with respect to the longitudinal axis L is ensured.

FIGS. 5 and 6 show the setting step I and the subsequent welding step II. According to this the auxiliary joining element 5 is first driven into the first component (aluminum sheet) 1 in a joining direction i.e., while maintaining the residual material thickness r. After the setting step I the element head 11 of the auxiliary joining element 5 protrudes with its head projection u from the surface of the first component 1 with a head projection u of 0.33 mm.

Subsequently for preparing the welding step the second joining partner 3 is placed on the topside of the auxiliary joining element 5, optionally with the adhesive layer 7 provided between the two joining partners 1, 2. The electrodes 25 are pushed together, wherein the auxiliary joining element 5 is oriented aligned with the two electrodes 25 and a spot welding process is performed so as to form the weld nugget 13 between the element head 11 and the second joining partner 3.

FIGS. 7 and 8 show in a view according to FIG. 2 an auxiliary joining element 5, which compared to the exemplary embodiments of FIG. 2 and FIG. 4 is the most preferred variant.

The auxiliary joining element 5 shown in FIGS. 7 and 8 has substantially the same geometry as the auxiliary joining element 5 shown in FIG. 2. Correspondingly in FIG. 7 the topside of the element head 11 is also configured flat.

In contrast to FIGS. 2 and 4, in FIGS. 7 and 8 the element base 19 of the auxiliary joining element 5 has no ring shaped circumferential acute angle contact edge (as in FIGS. 2 to 4) but rather a rounded contact edge. Its contact vertex S (FIG. 8) is inwardly offset by a radial offset with respect to the outer circumference of the element shaft 9.

In FIGS. 7 and 9 the head diameter $d_K$ is 5.5 mm while the shaft outer diameter $d_S$ is 3.35 mm. The length l of the auxiliary joining element 5 in FIG. 7 is 2.5 mm, wherein the head side height of $l_K$ is 0.3 mm. The material thickness $m_K$ (FIG. 7) along the longitudinal axis L is 1.3 mm. The here stated measurements are purely exemplary and do not limit the general inventive idea.

What is claimed is:

1. A method for joining at least two components, comprising:
    providing an auxiliary joining element having a hollow shaft and a head; in a setting step driving the shaft of the auxiliary joining element into a first component so as to maintain a residual material thickness of the first component; and in a joining step materially bonding the head of the auxiliary joining element with a second component, wherein the head of the auxiliary joining element at a topside thereof has an at least partially upward bulged dome-shaped material thickening extending over a planar parallel circumferential ring shoulder spaced apart from an outer rim of the head, wherein at an element base of the auxiliary joining element which faces away from the head, the auxiliary joining element has a ring contour which is adapted for placement on the first component so as to form a ring shaped contact zone for preparation of the setting step, said ring contour configured as an annular circumferential acute-angle contact edge, said annular circumferential acute-angle contact edge being radially inwardly offset from an outer wall of the hollow shaft and defining an opening of a hollow dome shaped space of the hollow shaft.

2. The method of claim 1, wherein the head of the auxiliary joining element is materially bonded with the second component by welding or gluing.

3. The method of claim 1, wherein a material thickness of the head of the auxiliary joining element is increased relative to a material thickness of a walling of the shaft of the auxiliary joining element so as to form a material thickening for providing welding material for a weld nugget between the head of the auxiliary joining element and the second component.

4. The method of claim 3, wherein the auxiliary joining element is rotation symmetric about a longitudinal axis, and wherein the material thickness of the head of the auxiliary joining element at the longitudinal axis is 1.5-4 times greater than the material thickness of the shaft of the auxiliary joining element.

5. The method of claim 1 wherein a diameter of the head of the auxiliary joining element is 1.25 to 1.5 times greater than an outer diameter of the shaft of the auxiliary joining element.

6. The method of claim 2, wherein a material thickness of the head of the auxiliary joining element is between 1 and 1.5 mm.

7. The method of claim 2, wherein a diameter of the head of the auxiliary joining element is between 5 and 7 mm.

8. The method of claim 2, wherein an outer diameter of the shaft of the auxiliary joining element is between 3.0 and 6.5 mm.

9. The method of claim 2, wherein a length of the auxiliary joining element is between 2.0 and 4.0 mm.

10. The method of claim 1, wherein the auxiliary joining element has an anti-corrosion layer, which is adapted for avoiding corrosion of a joint formed by the first and second component and the auxiliary joining element, and wherein a base material of the anti-corrosion layer is in particular zinc, ZnNi or Almac.

11. The method of claim 10, wherein a thickness of the anti-corrosion layer is 5 µm.

12. The method of claim 10, wherein the base material of the auxiliary joining element is a welding-capable wire material.

13. The method of claim 12, wherein the base material is a cold extruded steel or a cold upset steel, and has a material strength of 950 to 1100 N/mm².

14. The method of claim 1, wherein after the setting step, the head of the auxiliary joining element protrudes with a head projection from a surface of the first component.

15. The method of claim 14, wherein the head projection is between 0.1 to 0.5 mm.

16. The method of claim 3, wherein the walling of the shaft of the auxiliary joining element in the setting step is widened radially outwardly by a spread path which is perpendicular to a riveting direction so as to form an undercut.

17. The method of claim 16, wherein the spread path is greater than 0.1 mm.

18. The method of claim 14, further comprising applying adhesive between the first and second components, with the head projection locally displacing the adhesive.

* * * * *